April 27, 1937.   J. M. BEAUMONT   2,078,597
HYDRAULIC POWER TRANSMISSION MECHANISM
Filed Nov. 23, 1933   3 Sheets-Sheet 2

Fig. 3.

John M. Beaumont
Inventor
Eugene E. Stevens
Atty

April 27, 1937.  J. M. BEAUMONT  2,078,597
HYDRAULIC POWER TRANSMISSION MECHANISM
Filed Nov. 23, 1933  3 Sheets-Sheet 3

Inventor.
JOHN M BEAUMONT.
By Eugene E. Stevens
His Attorney.

Patented Apr. 27, 1937

2,078,597

UNITED STATES PATENT OFFICE 2,078,597

HYDRAULIC POWER TRANSMISSION MECHANISM

John Murray Beaumont, Huddersfield, England

Application November 23, 1933, Serial No. 699,459
In Great Britain November 25, 1932

4 Claims. (Cl. 60—54)

The invention relates to hydraulic coupling or power transmission means of the type in which driving and driven bladed members are coupled hydraulically by centrifugal action imparted to liquid by the rotation of the driving member.

The invention has for its object to construct a coupling of this character in which the speed of rotation transmitted to the driven member may be infinitely variable down to zero, whilst if desired provision may be added for enabling the direction of rotation of the driven member to be reversed.

The invention is characterized primarily in that the driving and driven bladed members are so constructed and arranged that axial movement of one of the said members in relation to the other will cause the blades of the driven member to be, as it were, gradually screened or shut off so as to reduce and finally to close altogether communication between the blades of the two members.

In addition to the screening or shutting-off action occasioned by the relative axial movement between the two bladed members such movement may also be arranged to open up a transfer passage or passages between the chamber in which the bladed members work and a suitable reservoir, so that simultaneously with the screening or shutting-off of the blades of the driven member the continued rotation of the driving member will cause liquid to be discharged from the working chamber to the reservoir.

Means may be provided whereby the amount of liquid in the working chamber whilst the clutch is running can be controlled at will; a constant circulation of liquid take place through the working chamber and the reservoir while the clutch is running; communication between the reservoir and the working chamber be automatically shut off when the coupling is idle; by which liquid can be re-admitted in controlled quantity to the working chamber to permit of easy re-starting of the engine before the automatic circulation of liquid begins; and by which a reverse drive can be obtained if desired.

In the accompanying drawings—

Fig. 3 is a sectional elevation of an embodiment including a reservoir for the liquid separate from but connected to the clutch.

Figure 1:
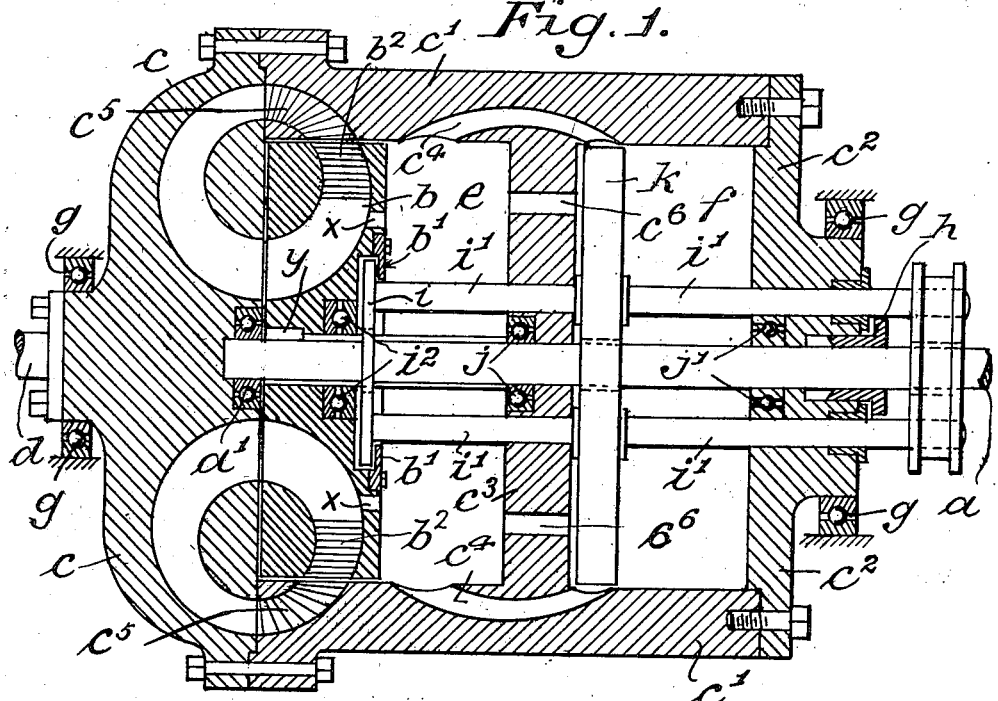
Fig. 1 is a sectional elevation of one embodiment of the invention.

Referring firstly to Fig. 1, $a$ represents the driving shaft, and $b$ the primary or driving bladed member. The secondary or driven bladed member is shown at $c$ and the driven shaft, which is aligned with the driving shaft, at $d$. The driven member $c$ carries or has secured to it a sleeve $c'$ and end plate $c^2$ which, with the said driven member constitute a casing forming a working chamber $e$ and a reservoir $f$. The casing is supported in bearings $g$, $g$, and the driving shaft passes through a stuffing box $h$ in the end plate $c^2$.

The end of the driving shaft is journalled at $a'$ in the inner end of the driven member $c$, and the boss of the driving member $b$ is splined on the driving shaft as shown at $y$.

A division wall $c^3$ in the casing separates the working chamber $e$ and the reservoir $f$, the latter being in the form of a cylinder surrounding and concentric with the driving shaft.

A plate $i$ carried by the inner ends of rods $i'$, $i'$, which extend slidably through the division wall $c^3$ and end plate $c^2$, is connected to the driving member $b$ by means of a ring $b'$, which is secured to the member $b$ and overlaps the peripheral portion of the plate $i$. An end-thrust bearing $i^2$ is provided between the plate $i$ and the member $b$, and bearings $j$, $j'$, are provided in the division wall $c^3$ and end plate $c^2$ for the driving shaft.

On the rods $i'$ there is secured, in the reservoir $f$, a piston $k$ and a series of passages $c^4$ connect the inner end of the reservoir with the peripheral inner surface of the working chamber $e$. The showing of the piston $k$ is conventional only and the fit between the same and the wall of reservoir $f$ need not be an absolutely tight fit, but only a reasonably tight sliding fit.

The plate $i$ fits with a suitable amount of play between the driving member $b$ and the ring $b'$ so that when the rods $i'$ are moved in either direction the piston $k$ will commence to move before the driving member $b$.

When the driving member is in fully operative position, as shown in the drawings, with its blades $b^2$ positioned fully opposite the blades $c^5$ of the driven member, the piston $k$ closes communication between the passages $c^4$ and the reservoir $f$.

In this position of the parts, liquid has flowed into the pump through the usual openings $x$ in the wall $b$ or otherwise, and the centrifugal action set up by the driving member causes the driven member to be rotated. If the driving member is moved axially, communication between its bladed passages and those of the driven member commences to be blanked off and the quantity of liquid permitted to act on the driven member is gradually reduced until finally the driven member is completely screened or blanked off and the drive consequently stops. Simultaneously with the screening off the blades of the driven member the transfer passages $c^4$ commence to be opened up and the liquid which otherwise would have acted on the driven member is discharged into the reservoir. As previously mentioned, the axial movement of the piston $k$ commences slightly before that of the driving member.

When it is desired to start from rest the inward movement of the piston $k$ first causes a quantity of liquid to be returned from the reservoir $f$ back through passages $c^4$ and the additional openings $c^6$, that may be provided in partition $c^3$ into the working chamber $e$ through passages $x$ to the blades $b^2$ of the driven member $b$ and the driving member then commences to be moved axially to unscreen its blades $b^2$, and simultaneously with the unscreening the communication between the working chamber $e$ and the reservoir $f$ is gradually cut off. Although the driving member $b$ and piston $k$ are described as being movable together they may, if preferred, be arranged to be operable independently.

Openings $c^6$ may be provided in the division wall $c^3$ to permit of the quick return of liquid to the working chamber.

Figure 2:
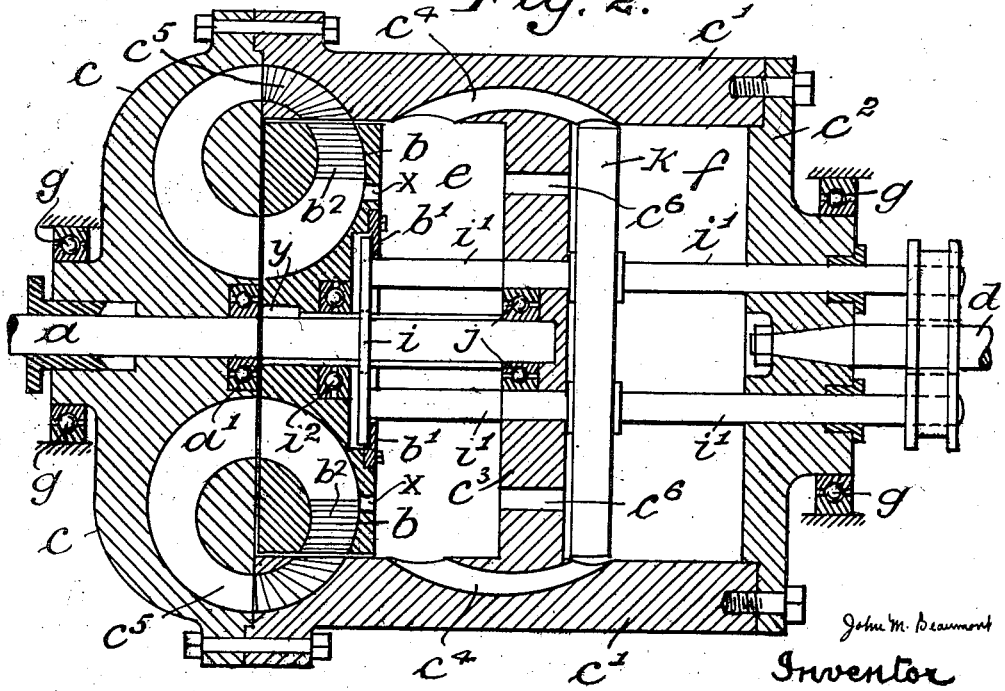
Fig. 2 is a similar view of an alternative embodiment corresponding generally to that shown in Fig. 1, but differing a little in arrangement.

In the arrangement shown at Fig. 2, as will be seen from the drawings, the only real difference from that shown in Fig. 1 is that the driving shaft $a$ passes through the driven member $c$ and has its inner end journalled in the division wall $c^3$, whilst the driven shaft is connected to the end plate $c^2$ of the casing.

In the embodiment shown in Fig. 3 the general arrangement corresponds substantially to that shown in Fig. 2, but instead of a reservoir for liquid being constituted in the casing, and the transfer passages being controlled by a piston, a separate reservoir $m$ is employed. In this instance, the transfer ports $c^4$ are connected by passages such as $n$ in the end plate $c^2$ to an annular port $o$ formed in a sleeve $o'$ surrounding the boss $c^7$ of the end plate and connected by a pipe $p$ to the lower end of the reservoir $m$.

A cap $r$ flanged outwardly at its lower end as at $r'$ is adapted to sit upon the end of the pipe $p$, inside the reservoir, and when so seated to form a closure to a series of openings $s$ in the base of the tank, such openings communicating with a chamber $t$ constituted around the pipe $p$ immediately below the reservoir and connected by a pipe $u$ with a second annular port $o^2$ in the sleeve $o'$ from which second annular port a passage or series of passages such as $v$ lead back into the working chamber towards the centre of the same.

A piston $m'$ in the reservoir is suitably controlled as to its position, and it may be operated by compressed air, or by electricity, or hydraulically or mechanically as may be preferred.

The capacity of the reservoir $m$ is suitably proportioned to that of the working chamber, so that by appropriate adjustment of the piston $m'$ the quantity of liquid retained in the working chamber when the clutch is running can be regulated.

When the clutch is running the centrifugal pressure on the liquid in the working chamber causes the cap member $r$ to be raised clear of the openings $s$ leading to the return flow pipe $u$ so that liquid passing back to the working chamber through the central passage or passages $v$, a constant circulation of the liquid thus being maintained.

When the clutch stops or is slowed down to a speed at which the pressure of liquid in the reservoir is greater than that produced by centrifugal action in the working chamber, the cap $r$ falls and the liquid in the tank is prevented from returning to the working chamber.

For restarting purposes it may be arranged that a determined quantity of liquid is retained in the working chamber when the clutch is stopped, or piston $m'$ may be raised to lift by suction the cap $r$ to release and a quantity of liquid to be returned to the working chamber. It will be seen that restarting can be made an easy matter since only the minimum of liquid may be present in or be returned to the working chamber at this time, a feature of considerable advantage in large clutches.

The driving member $b$ may have peripheral blades or throwers $b^3$ (see Fig. 3) to assist in forcing the liquid through the transfer ports $c^4$.

It will be apparent that in any of the embodiments herein described and illustrated the driving member might be stationary and the driven member be movable axially in relation thereto.

Figure 4:
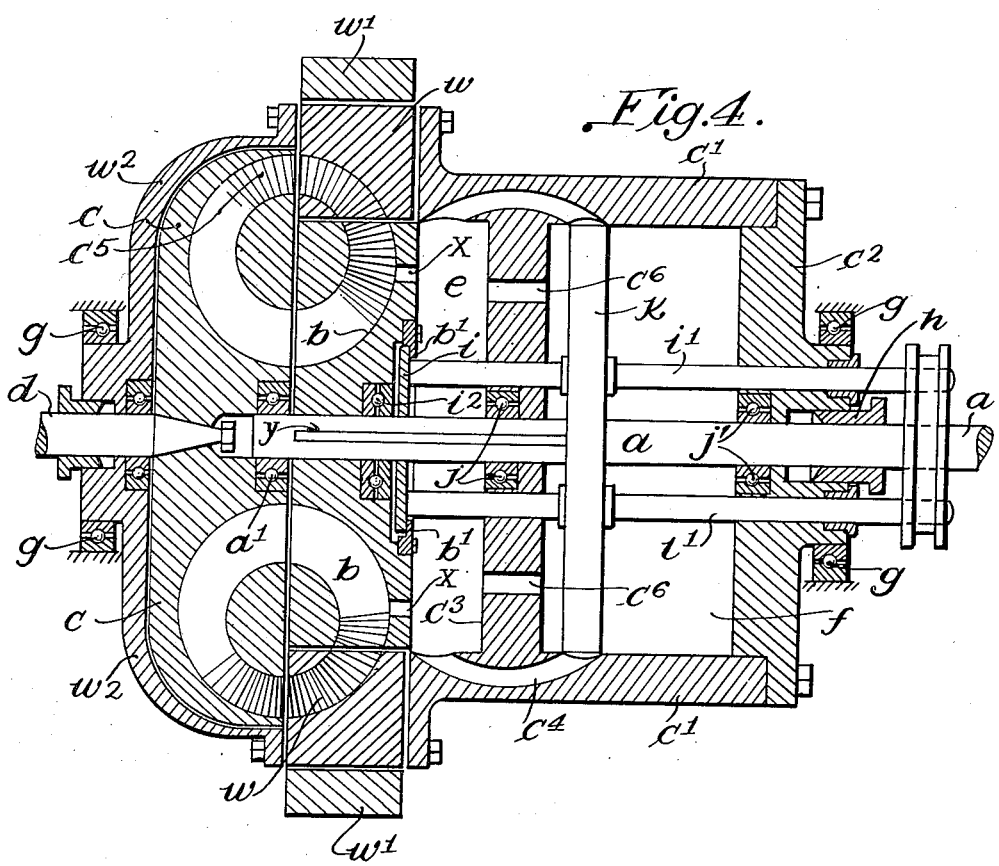
Fig. 4 is a sectional elevation of an embodiment including means for obtaining a reverse drive.

In the embodiment shown at Fig. 4 an intermediate bladed member $w$ is interposed in any well known manner between the driving and driven members $b$ and $c$, such intermediate member being controlled by a typical brake band $w'$, which may be forced into engagement with the periphery of member $w$ by any suitable means, (not shown) to retard its rotation either partially or completely.

If rotation of the member $w$ is retarded the action of the fluid on the blades of the driven member is such as to slow down the rotation of the latter whilst if the rotation of the member $w$ is retarded beyond a determined point, or is completely arrested, the direction of the streams of liquid emerging from it will be such as either to stop rotation of the driven member or cause the direction of its rotation to be reversed.

In this instance the sleeve $c'$ is secured to one side of the intermediate bladed member $w$ and a cap member $w^2$ is secured to the other side of the said intermediate member. A working chamber $e$ and reservoir $f$, are provided as in the other forms of the invention.

In the device of Figures 3 and 4 the fluid gets to the blades $b$ through the space between $c'$ and $b$; and also opening $x$ may be provided in the member $b$ as mentioned in connection with Figs. 1 and 2.

Having thus described my invention, what I claim as new and desire to secure by Letters Patent is:—

1. A hydraulic power transmission mechanism of the class described comprising driving and driven bladed members, one of said bladed members being retractable from the other, an unbladed portion of the second bladed member providing a motive fluid chamber arranged to receive the retractable bladed member when the same is retracted, said chamber providing fluid communication to the blades of said retractable member, said unbladed portion of said second member also serving to gradually screen from each other the blades of said members as the first member is retracted into the chamber of the second member whereby to gradually cut off the supply of motive fluid from the blades of the driving member to those of the driven member as said retraction takes place, there being a reservoir provided by the unbladed portion of said second member, a partition separating said reservoir and chamber and having ports opening therethrough, passages provided in the unbladed portion of said second member and leading from said reservoir to said chamber through the side walls thereof at a point between said partition and the blades of said second member, said passages receiving and transferring to said reservoir fluid from the blades of said first member when the same has been retracted, and said partition ports retransferring fluid to said first member blades through said chamber whereby to maintain a circuit when the blades of said first member are in cooperative relationship with said passages.

2. The combination set forth in claim 1, and including an operating member for advancing and retracting said first bladed member and having a lost motion connection therewith, a piston fixedly carried by said operating member and located in said reservoir, said piston arranged to seal the reservoir ends of said passages when the blades of said members are in fully operative relationship, and said piston moving in advance of said first-mentioned bladed member whereby to open up communication between said chamber and reservoir before said first bladed member commences to move to blade screening position and also to return fluid to said chamber from said reservoir before the blades of said retractable member are moved toward unscreened position so as to assure of an adequate supply of fluid to the blades of said members when they come into operative relationship.

3. A hydraulic power transmission mechanism of the class described comprising driving and driven members having blades, one of said bladed members being retractable from the other, an unbladed portion of the second bladed member providing a motive fluid chamber arranged to receive said retractable bladed member when the same is retracted, said chamber providing fluid communication to the blades of the retractable member, said unbladed portion of said second bladed member also serving to screen the blades of said members from each other when the first member is retracted into the motive fluid chamber of the second member whereby to gradually cut off the fluid from the driving to the driven bladed member when the retraction takes place, a reservoir, a pipe connection from the peripheral part of said chamber to said reservoir, a valve member in said reservoir adapted to be opened by the entry of liquid into the reservoir under centrifugal action when the driven member is in operation and to close when said member is stationary, and a return pipe connection between said reservoir and chamber and controlled by said valve so that whilst the driven member is in operation a constant circulation of liquid takes place through said chamber and reservoir.

4. The combination set forth in claim 3 and means to vary the effective capacity of said reservoir and to unseat said valve when the driven member is stationary.

JOHN M. BEAUMONT.